(12) United States Patent
Zelenack, Jr.

(10) Patent No.: US 10,767,971 B2
(45) Date of Patent: *Sep. 8, 2020

(54) MEASURING TAPE WITH WEATHERPROOF SEAL

(71) Applicant: MUCKTAPE LLC, Drums, PA (US)

(72) Inventor: Joseph P. Zelenack, Jr., Drums, PA (US)

(73) Assignee: MUCKTAPE LLC, Drums, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,747

(22) Filed: Apr. 16, 2019

(65) Prior Publication Data

US 2019/0242685 A1 Aug. 8, 2019

Related U.S. Application Data

(63) Continuation of application No. 15/845,292, filed on Dec. 18, 2017, now Pat. No. 10,260,852, which is a continuation of application No. 14/792,119, filed on Jul. 6, 2015, now Pat. No. 9,846,021.

(60) Provisional application No. 62/021,130, filed on Jul. 5, 2014.

(51) Int. Cl.
*G01B 3/10* (2020.01)
*G01B 3/1041* (2020.01)
*G01B 3/1084* (2020.01)

(52) U.S. Cl.
CPC ......... *G01B 3/1041* (2013.01); *G01B 3/1084* (2013.01); *G01B 2003/1053* (2013.01); *G01B 2003/1058* (2013.01)

(58) Field of Classification Search
CPC ............... G01B 3/1041; G01B 3/1084; G01B 2003/1053; G01B 2003/1058
USPC .......... 33/769, 755, 760, 761, 768, 725, 770
See application file for complete search history.

(56) References Cited

U.S. PATENT DOCUMENTS

| | | |
|---|---|---|
| 1,679,178 A | 7/1928 | Shillman |
| 1,876,744 A | 9/1932 | Posgate |
| 2,035,379 A | 3/1936 | Stewart |
| 3,255,531 A | 6/1966 | Anderson |
| 4,228,589 A | 10/1980 | Chemay |
| 4,521,934 A | 6/1985 | Castle |
| 5,056,180 A | 10/1991 | Stanton |
| 5,588,220 A | 12/1996 | Cousins et al. |
| 6,323,159 B1 | 11/2001 | Raza |
| 6,338,204 B1 | 1/2002 | Howle |
| 6,477,785 B1 | 11/2002 | Hsu |
| 7,269,913 B2 | 9/2007 | Holevas |
| 7,454,845 B2 | 11/2008 | Wise |
| 7,918,037 B1 | 4/2011 | Polkhovskiy |
| 8,196,308 B1 | 6/2012 | Baldi, Jr. |
| 8,567,085 B2 | 10/2013 | Roeske |
| 8,806,770 B2 | 8/2014 | Steele et al. |
| 9,846,021 B2 | 12/2017 | Zelenack, Jr. |
| 10,260,852 B2 * | 4/2019 | Zelenack, Jr. ....... G01B 3/1041 |

(Continued)

*Primary Examiner* — Christopher W Fulton
(74) *Attorney, Agent, or Firm* — Berenato & White, LLC

(57) ABSTRACT

The present invention relates measuring tapes and methods for making thereof. In particular, the measuring tape of the present invention contains a wipe mechanism for cleaning the tape as it retracts into its housing. The wipe mechanism contains a top wipe and a bottom wipe for removing debris from the top and bottom surfaces of the tape, respectively, when it is retracted after use.

17 Claims, 4 Drawing Sheets

(56) References Cited

U.S. PATENT DOCUMENTS

2012/0036727 A1    2/2012   McCarthy
2016/0290776 A1   10/2016   Hoppe et al.

* cited by examiner

MEASURING TAPE WITH WEATHERPROOF SEAL

CROSS-REFERENCE TO RELATED APPLICATIONS AND CLAIM TO PRIORITY

This application is a continuation of U.S. application Ser. No. 15/845,292, filed Dec. 18, 2017, now U.S. Pat. No. 10,260,852, which is a continuation of U.S. application Ser. No. 14/792,119, filed Jul. 6, 2015, now U.S. Pat. No. 9,846,021, which claims benefit to U.S. Provisional Patent Application No. 62/021,130, filed Jul. 5, 2014, the disclosures of which are incorporated herein by reference.

FIELD OF THE INVENTION

The present invention relates to measuring tapes and methods for making thereof. In particular, the measuring tapes of the present invention contain a device for cleaning the tape as it retracts.

BACKGROUND

A measuring tape represents a flexible form of linear rule, typically consisting of a ribbon or tape of cloth, plastic, fiberglass, or metallic strip of a uniform width containing measurement markings along its length. This style of measuring device provides advantages over a traditional fixed rule in that it is collapsible and easily stored in a coiled form. One common form of tape measure that is well known in the construction industry retains the measuring tape by coiling it around a spool contained within a protective housing. The measuring tape may be retracted into the housing by hand winding the tape or by releasing a spring lock so the winding action of the spring retracts the tape.

Measuring tapes are often used in locations where particulate matter, such as sawdust, dirt, and powders from metal or masonry products, and water are present. In typical applications, measuring tapes are placed onto a work surface and a measurement is read between two or more points. When used in this manner debris contained on the work surface may adhere to and accumulate on the tape. Subsequent retraction of the tape may transport the debris inside the protective housing where it becomes trapped, unable to exit through the housing's small passageway. Once debris is trapped inside the tape measure's protective housing, it continues to accumulate and eventually foul the tape measure's internal mechanisms, sometimes rendering the tape inoperable. Over time, in addition to lost time and aggravation to the user, the lifespan of the tape is greatly reduced.

U.S. Pat. No. 4,228,589 to Chemay discloses a tape measure for underwater use. This tape measure is described as reliable, durable and effective for underwater work. However, instead of preventing moisture from entering, it is described as easily disassembled for inspection and cleaning without tools.

U.S. Pat. No. 6,477,785 to Hsu discloses a measuring tape that is designed for fast and easy retraction of tape measures. The retracting mechanism is a hand crank that engages a reverse gear to retract the tape. No mechanism for cleaning the tape is disclosed.

U.S. Pat. No. 8,567,085 to Roeske discloses a retractable measuring tape containing an opening in the tape housing. The opening, when the tape is in use, is sealed with a plug. The plug can be detached from the housing by a user to access the interior of the housing to remove debris therein.

Therefore, there remains a need for a measuring tape that retracts quickly but does not transport particulate materials and water into its protective housing.

SUMMARY OF THE INVENTION

The present invention relates to measuring tapes, specifically to measuring tapes for use in harsh conditions on a construction site where moisture and dirt can render a measuring tape inoperable. The measuring tape of the present invention contains a wipe mechanism at the tape port to wipe the tape of any debris as it retracts into its housing assembly. The wipe mechanism contains an upper wipe and a lower wipe to clean the upper surface and lower surface, respectively, of the tape.

Methods for making the measuring tape of the present invention and retrofitting an existing tape measure to include a wipe mechanism are also disclosed.

BRIEF DESCRIPTION OF THE DRAWINGS

The foregoing background and summary, as well as the following detailed description, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION

Figure 1:
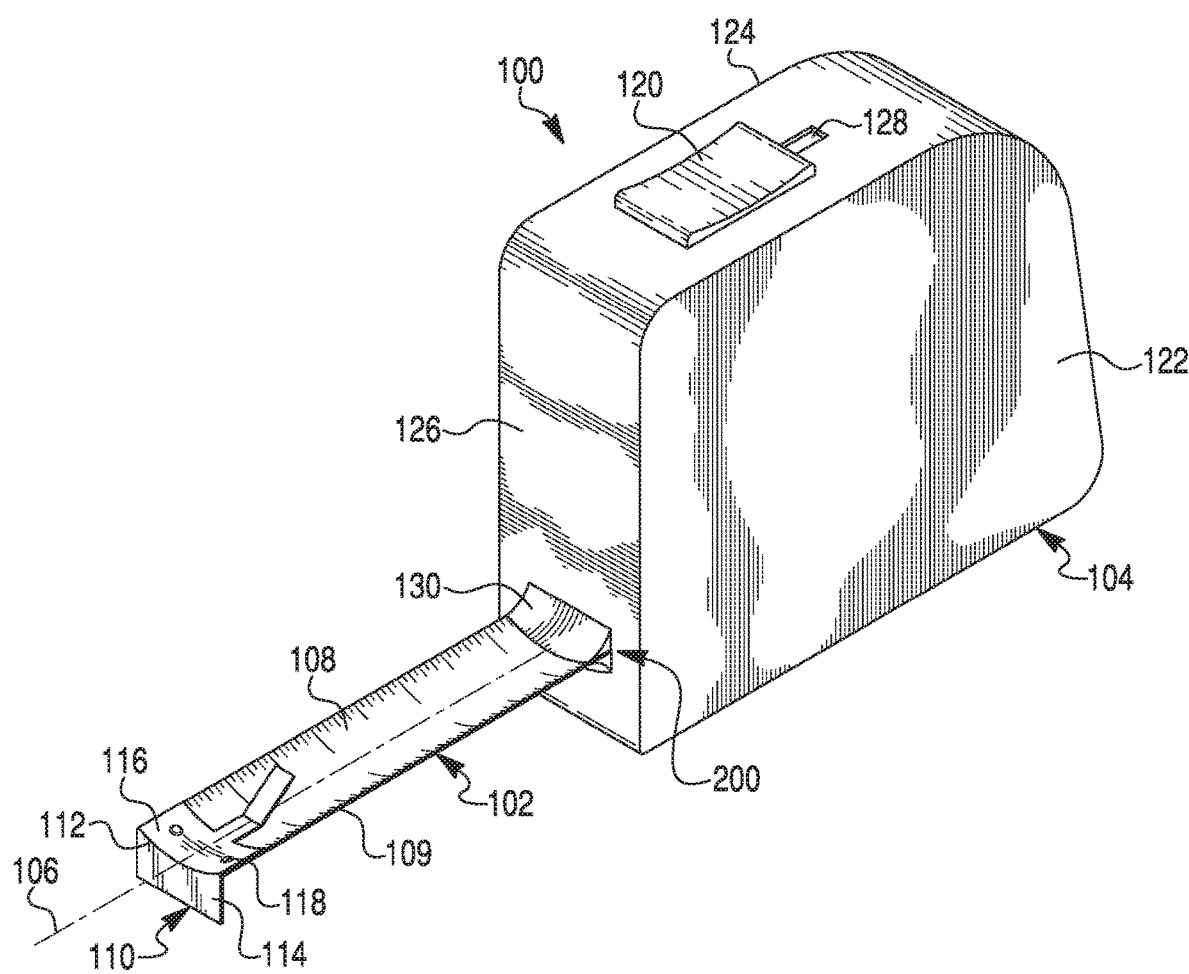
FIG. 1 shows a perspective view of a partially extended measuring tape of the present invention.

When referring to the figures, like reference numerals designate like elements throughout, while the different drawings may illustrate various embodiments of the present invention. The embodiments illustrated and discussed herein are presented for the sole purpose of enabling one to make and use the invention, is not exhaustive, and should not be understood as limiting in any way. It should be understood that the invention is not limited to the precise arrangements, dimensions, and instruments shown and described.

FIG. 1 illustrates a length measurement device, more specifically, a measuring tape 100. The measuring tape 100 includes a coilable tape 102 that is at least partially disposed within a housing assembly 104. A variable-length segment of the tape 102 is retractable and extendable from the housing assembly 104 along a tape axis 106. When extended from the housing assembly 104, the extended portion of the tape 102 may form a concavo-convex cross sectional shape that includes a concave or top surface 108 of the tape 102 and a convex or bottom surface 109 of the tape 102. Although a concavo-convex cross sectional shape is preferred in spring-loaded, automatically recoiling measuring tapes, a flat tape 102 is also sufficient for the present invention, particularly for the manual winding measuring tape. At least the top surface 108 of tape 102 includes indicia for taking measurements.

Figure 4:
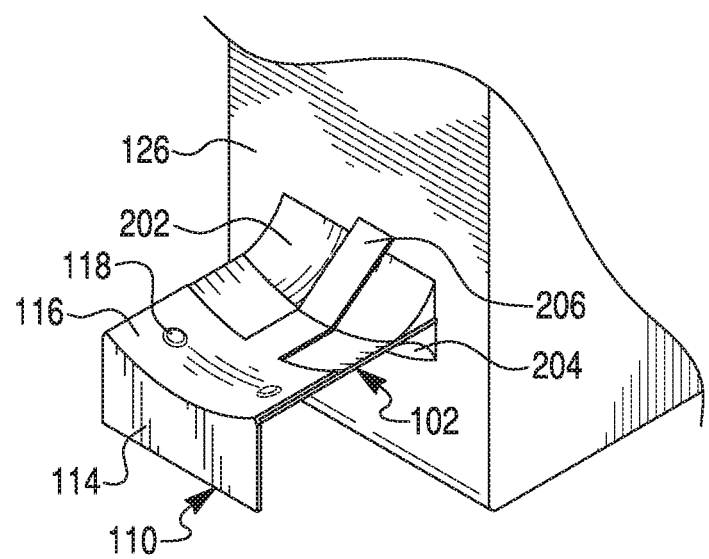
FIG. 4 shows an exploded fragmentary view of a fully retracted measuring tape of the present invention.

A hook assembly 110 is fixedly coupled to a first end portion 112 of the tape 102. The hook assembly 110 includes a hook body 114 and an attachment portion 116 for fastening the hook assembly 110 to the first end portion 112 of the tape 102. FIG. 1 shows the attachment portion 116 may fastened to the first end portion 112 by rivets 118, but other fasteners, such as adhesives, welds, folds, solders, etc., may also be appropriate for the present invention. In preferred embodiments, the attachment portion 116 forms a concavo-convex cross section complementary to that of the tape 102. In some embodiments, as illustrated in FIG. 1, the attachment portion 116 may span the entire width of the tape 102. In other embodiments, the attachment portion 116 may span only a portion, e.g. a center portion, of the tape (as shown in FIG. 4) to facilitate the attachment of the hook assembly 110 to the tape 102. A hook body 114 extends substantially perpendicular to the attachment portion 116, and thus the tape 102. The hook body 114 is configured to engage an end portion of a workpiece to be measured, such as a board or beam, and may contain serrations for secured engagement with the workpiece. In certain embodiments, the hook may also be magnetic for engaging ferromagnetic workpieces. The hook body 114 serves two functions: 1) to engage the workpiece; and 2) to provide the "0" mark indicating the starting point of the rule portion of the tape 102. The hook assembly 110 may be allowed to float in the direction of the tape axis 106 an amount equivalent to the thickness of the hook body 114. This allows for accurate inside and outside measurements to be read without having to account for the thickness of the hook body 114. Although the hook body 114 is illustrated in the drawings as spanning the entire width of the tape 102, that is not necessary, as it may span only a portion of the width of the tape 102, as long, as it functions properly.

A second end of the tape 102 is coupled to the housing assembly 104. The tape 102 is attached to a spool disposed within the cavity of the housing assembly 104. A retraction mechanism is coupled to the spool to provide for retraction of the tape 102. The retraction mechanism may involve a simple hand winding mechanism or a powered mechanism which may include an elongated coiled spring for motive force. A tape lock 120 is provided to selectively engage at least one of the spool and the retraction mechanism, such that the extended segment of the tape 102 remains at a desired length.

The housing assembly 104 includes a first side wall 122, a second side wall 144, and a peripheral wall 126 connecting the first side wall 122 and the second side wall 144. Each of the first side wall 122 and the second side wall 124 may have circular or polygonal shapes or combinations thereof. The housing assembly 104 may typically be made of two halves: a first half containing the first side wall 122 and a portion of the peripheral wall 126, and second half containing the second side wall 124 and a portion of the peripheral wall 126. The two halves are then assembled to partially contain the tape 102 therebetween. The housing assembly 104 may be molded from plastic materials, including glass filed polymers, or may be cast, forged or machined from metallic materials, such as aluminum, steel, zinc, or brass, which are chosen for their impact resistance. Portions of the housing assembly 104 may be co-molded or separately formed.

A slot 128 is defined along a portion of the peripheral wall 126. The slot 128 is provided to allow for sliding movement of the tape lock 120 relative to the housing assembly 104. On another portion of the housing assembly 104, a tape port 130 is provided to allow for the retraction and extension of the tape 102 to and from the internal cavity of the housing assembly 104, as best shown in FIG. 4. Ideally, when in its fully retracted configuration, a small portion of the tape 102 should remain accessible outside of the housing assembly 104, such that a user may grasp the end portion 112 of the tape 102 and extend the tape by pulling it away from the housing assembly 104. The tape port 130 serves this purpose, allowing the measuring tape 102 to pass into the housing assembly 104 without binding.

Figure 2:
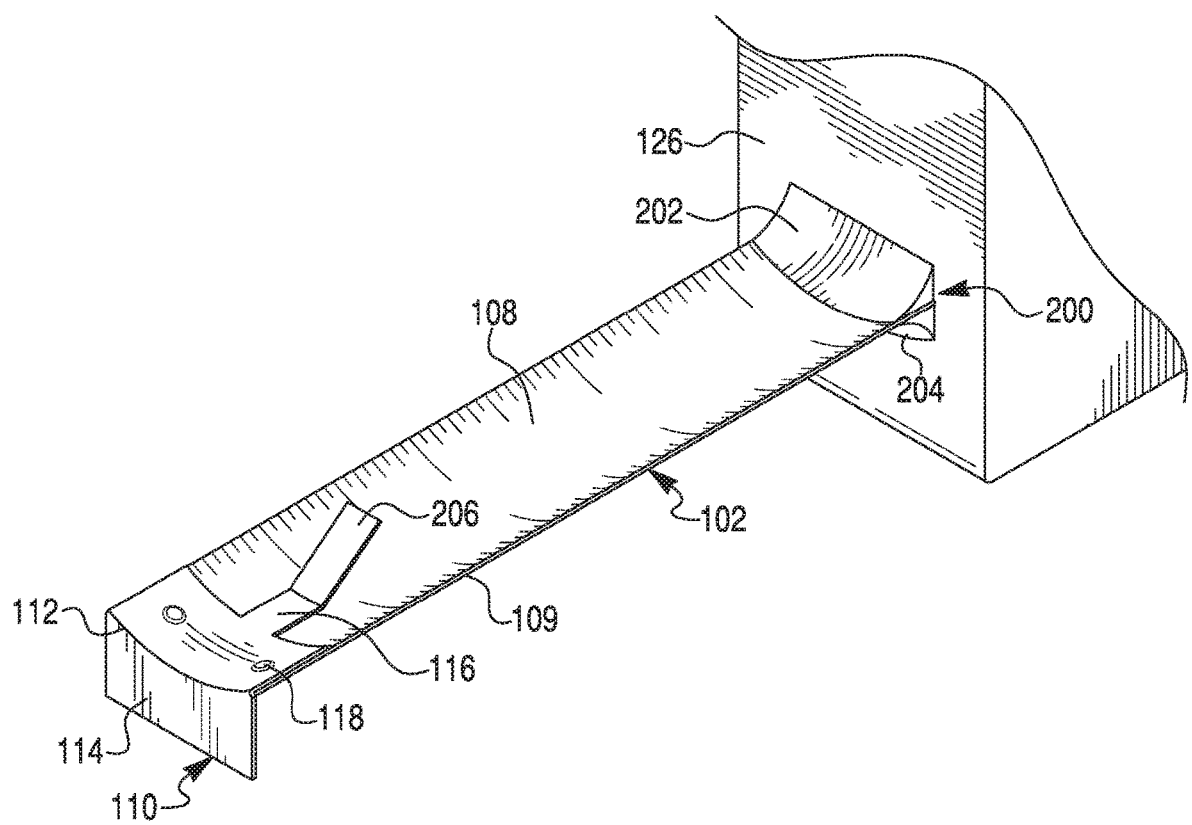
FIG. 2 shows an exploded fragmentary view of the partially extended measuring tape of the present invention.
Figure 3:
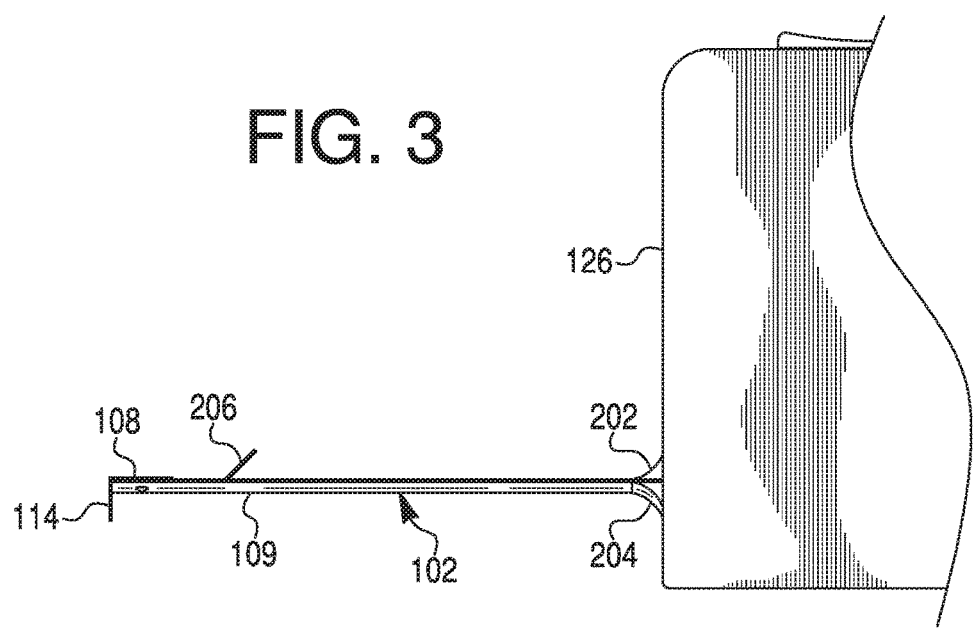
FIG. 3 shows a fragmentary side view of the partially extended measuring tape of the present invention.

A wipe mechanism 200 (as best shown in FIGS. 2-4) is attached to the housing assembly 104 at the tape port 130 to wipe the tape 102 of any debris as it retracts into the housing assembly 104. The wipe mechanism contains an upper wipe 202 and a lower wipe 204 that encloses the tape port 130. The upper wipe 202 and the lower wipe 204 protrude away from the housing assembly 104 and are shaped such that they cooperate to provide a slit through which the tape 102 passes. In a preferred embodiment, the upper wipe 202 and lower wipe 204 provide a slit that mirrors the concavo-convex cross-sectional shape of the tape 102. The upper wipe 202 is in contact with and presses against the top surface 108 of the tape 102; and the lower wipe 204 is in contact with and presses against the bottom surface 109 of the tape 102. The upper wipe 202 may form an angle with the top surface 108 of the tape 102 of 0° to about 45°, preferably about 15° to about 25°, more preferably about 16° to about 20°. Likewise, the angle between the lower wipe 204 and the bottom surface 109 of the tape 102 may be at a similar range. The upper and low wipes 202, 204 cooperate to clean the top and bottom surfaces 108, 109, respectively, of the tape 102 through a wiping action when the tape 102 retracts into the housing assembly. Due to friction created by the upper and lower wipes 202, 204 on the tape 102, if the measuring tape 100 uses a spring to provide motive force for retraction, it is preferred that the spring used by the present invention produces a retraction force greater than springs normally used for ordinary tape measures. Preferably, the spring provides a force that is about 0.5 to about 2.0 lb. to overcome the friction from the upper and lower wipes 202, 204, more preferably about 1.0 to about 1.5 lb. The spring force should be sufficient to overcome friction between the upper and lower wipes 202, 204 and the tape 102 when the tape 102 is covered with debris after use.

The upper and lower wipes 202, 204 are preferably made of a flexible, resilient material. Polymeric materials are preferred, including polyurethane, rubber, silicone, etc., with polyurethane being most preferred material. For example, a polyurethane having at least one, at least three, at least five, at least six, at least eight, or at least ten of the following physical characteristics, is appropriate for the upper and lower wipes 202, 204:

| Property | Unit | Value* | Standard |
|---|---|---|---|
| Durometer hardness | SHORE A | 95 | DIN 53505 |
| Durometer hardness | SHORE D | 48 | DIN 53505 |
| Density | g/cm$^3$ | 1.24 | DIN 53479 |
| Tensile strength | N/mm$^2$ | 50 | DIN 53504 |
| Elongation at break | % | 380 | DIN 53504 |
| 100% modulus | N/mm$^2$ | 17 | DIN 53504 |
| Compression set: 70° C./24 h, 20% compression | % | 25 | — |
| Compression set: 100° C./24 h, 20% compression | % | 30 | — |

-continued

| Property | Unit | Value* | Standard |
| --- | --- | --- | --- |
| Compression set: 70° C./70 h, 10% compression | % | — | DIN 53517 |
| Tear strength | N/mm | 120 | DIN 53515 |
| Rebound resilience | % | | DIN 53512 |
| Abrasion | mm$^3$ | 17 | DIN 53516 |
| Minimum service temperature | ° C. | −20 | — |
| Maximum service temperature | ° C. | 110 | — |

*The numerical data are valid for test pieces of the corresponding ISO, DIN and ASTM standards and can vary by 20%, preferably 10%, and more preferably 5%.

The polymeric material may be self-lubricating. Methods for making self-lubricating polymers are known in the art and are described, e.g., in U.S. Pat. Nos. 6,323,159 and 3,382,202, which are incorporated herein by reference. Generally, the polymer is made self-lubricating by adding a fatty acid amide, such as erucamide and/or crodamide, to the polymer. When in the polymer, the fatty acid amide blooms to the surface of the polymer to provide a lubricating layer on the surface.

Figure 5:
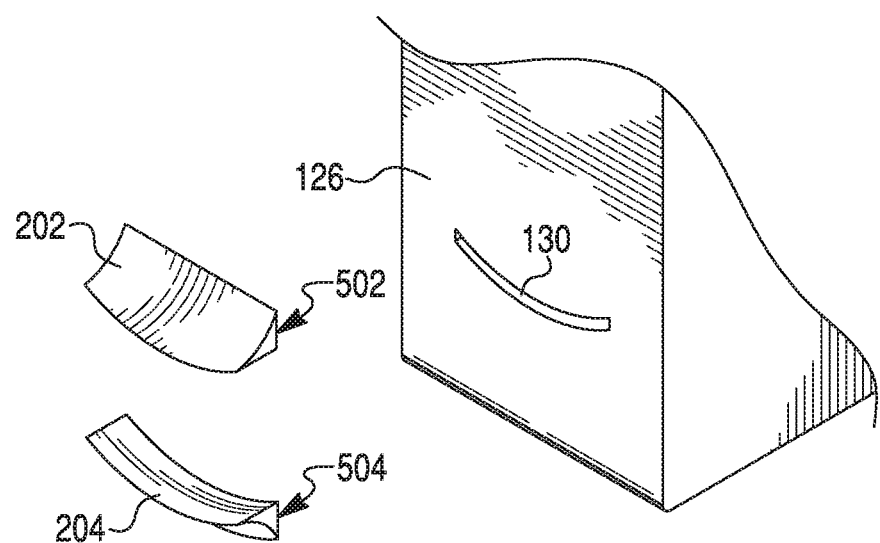
FIG. 5 shows an exploded disassembled view of the wipe mechanism.

The upper and lower wipes 202, 204 may be attached to the housing assembly 104 as known in the art. For example, they may be molded directly to the tape port 130. Alternatively, the upper and lower wipes 202, 204 may be attached to the tape port 130, e.g. by an adhesive. In yet another alternative, the upper and lower wipes may be held in place by clamping them between the two halves of the housing assembly 104. Preferably, as illustrated in FIG. 5, the tape port 130 has a generally a concavo-convex cross shape that matches and accommodates the tape 102. The tape port 130, however, is generally larger than the cross section of the tape 102. The upper wipe 202 and the lower wipe 204 may be provided as two separate pieces, as shown in FIG. 5. Each of the wipes 202, 204 contains an attachment portion 502, 504: the upper wipe 202 contains an upper attachment portion 502; and the lower wipe 204 contains a lower attachment portion 504. These attachment portions 502, 504 are attached, e.g. by an adhesive, to the portions of the peripheral wall 126 immediately adjacent to the tape port 130. The adhesive used may be, e.g., a hot melt adhesive or a cyanoacrylate.

Because the upper and lower wipes 202, 204 protrudes away from the housing assembly 104 and are made of a flexible material, it is generally undesirable to have the hook assembly 110, when the tape is fully retracted, come into contact with the upper and lower wipes 202, 204. Repeated slamming and pushing of the hook assembly 110 against the wipes 202, 204 during retraction of tape 102 is likely to prematurely damage the wipes 202, 204. As such, in preferred embodiments, the attachment portion 116 of the hook assembly 110 contains an elevated portion 206 extending toward the housing assembly 104 and rising away from the top surface 108 of the tape 102, as best shown in FIG. 4. When the tape 102 retracts, the elevated portion 206 makes contact with the peripheral wall 126 above the upper wipe 202 (as best shown in FIG. 4) to stop the tape 102 from further retracting into the housing assembly 104. That way, the hook assembly 110 does not slam onto or press against the upper and lower wipes 202, 204 when the tape 102 is in its fully retracted position. Although FIG. 4 shows the elevated portion 206 being part of the attachment portion 116, the elevated portion 206 may also be formed and attached separately to the tape 102. The elevated portion 206 may take on different configurations, as long as its functions to prevent the hook assembly 110 from slamming into or pressing against the upper and lower wipes 202, 204 when the tape 102 is fully retracted. For example, although FIG. 4 shows the elevated portion 206 being raised at an angle (preferably about 10° to about 45°, more preferably about 15° to about 30° from the surface 108 of the tape 102, the elevated portion 206 may take on an S-shape or L-shape rather than a straight segment.

Figure 7:
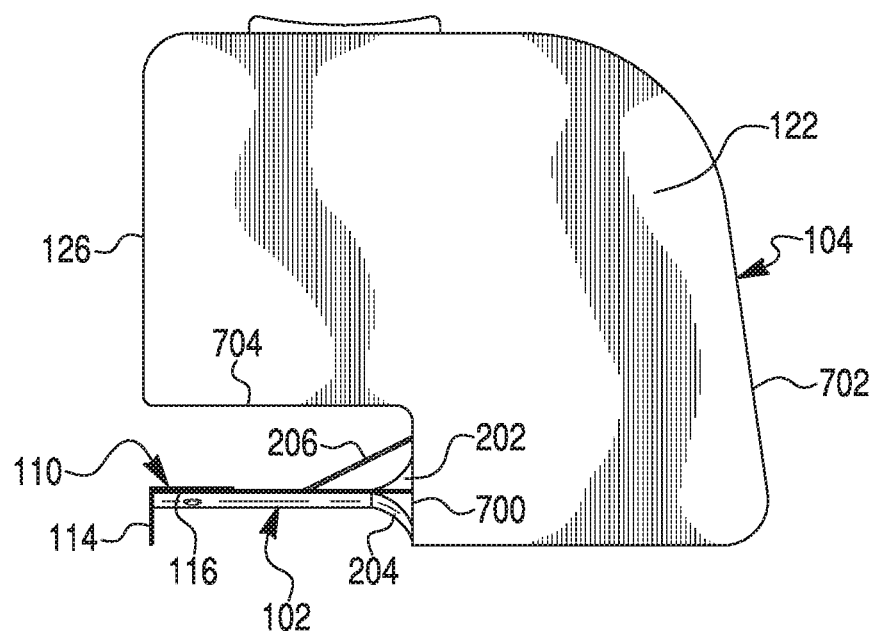
FIG. 7 shows an alternative position for the wipe mechanism.

In an embodiment, as best illustrated in FIG. 7, the peripheral wall 126 contains a set back wall 700 where the tape port 130 and wipe mechanism 200 are located. The set back wall 700 allows the wipe mechanism 200 to be located further toward the rear 702 of the housing assembly 104 under a ledge 704 to further protect the tape 102 and the wipe mechanism 200, when the tape is fully retracted.

In use, the tape 102 may be extended from the housing assembly 104 to be used for length measurement. As noted above, the environment in which the tape is used may contain particulate matters, such as sawdust, dirt, and powders from metal or masonry products, and water, which may adhere on and/or accumulate on the tape 102 when it is outside of the housing assembly 104. When the tape 102 retracts back into housing assembly 104, however, the upper and lower wipes 202, 204, by being in contract with and pressing on tape 102, remove the particulate materials and water that are on the tape. Essentially, the tape 102 is scraped clean by the upper and lower wipes 202, 205 before entering and does not carry debris into the housing assembly 104. The retraction stops when the elevated portion 206 hits the peripheral wall 126 of the housing assembly 104, thereby preventing the hook assembly 110 from hitting the upper and lower wipes.

Figure 6:
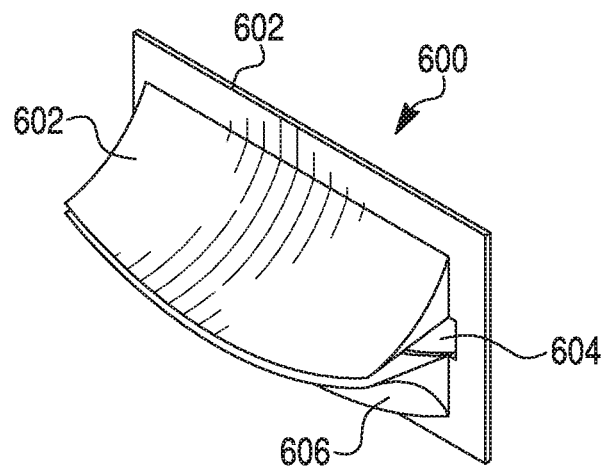
FIG. 6 shows an elevational view of a retrofitting kit of the present invention.

It should be understood that although the above measuring tape 100 and methods for making thereof are described for a newly manufactured measuring tape, they could be used to add a wipe mechanism to an existing tape measure. Referring to FIG. 6, a retrofitting kit 600 may be provided, which contains a base plate 602 having an opening 604 therethrough. The opening 604 may be arc shaped to approximate the concavo-convex cross sectional shape of the tape 102 and to allow the tape 102 to pass therethrough. The opening 604 is covered with an upper wipe 608 and a lower wipe 606, which substantially correspond to the upper and lower wipes 202 and 204, and have the same shape and function. The retrofitting kit 600 may be attached over the tape port 130 of an existing tape measure to provide a mechanism for removing debris from the tape 102 as it retracts into the housing assembly 104.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A measuring tape, comprising:
   a. a housing assembly;
   b. a tape disposed in the housing assembly, the housing assembly containing a tape port for the retraction and extension of the tape to and from an internal cavity of the housing assembly; and
   c. a wipe assembly attached to the housing assembly configured to clean the tape when it retracts into the housing assembly, the wipe assembly comprising:
      i. an upper wipe blade positioned above the tape port engaging a top surface of the tape, and ii. a lower wipe blade positioned below the tape port and engaging a bottom surface the tape, the upper wipe blade and the lower wipe blade defining a concavo-convex slit through which the tape passes.

2. The measuring tape of claim 1, wherein the upper and lower wipe blades are made of a flexible, resilient material.

3. The measuring tape of claim 2, wherein the flexible, resilient material is a polyurethane.

4. The measuring tape of claim 3, wherein the upper wipe blade forms an angle with the top surface of the tape of 0° to about 45°.

5. The measuring tape of claim 3, wherein the lower wipe blade forms an angle with the bottom surface of the tape of 0° to about 45°.

6. The measuring tape of claim 3, wherein a first end of the tape comprises a hook assembly containing a hook body extending from the tape, and an attachment portion for attaching to the first end of the tape.

7. The measuring tape of claim 6, wherein the attachment portion floats in the direction of the tape an amount equivalent to the thickness of the hook body.

8. The measuring tape of claim 3, wherein the tape coils on a spool that is driven by a coiled spring which provides sufficient force to overcome the friction between the wipe assembly and the tape and to retract the tape.

9. The measuring tape of claim 3, wherein the housing assembly provides a set back wall where the tape port is located under a ledge.

10. The measuring tape of claim 3, wherein the tape is coiled in the internal cavity.

11. A method for making a measuring tape, comprising the steps of:
   a. providing a tape;
   b. enclosing the tape inside a housing assembly with one end of the tape extending outside of the housing assembly through a tape port;
   c. attaching a wipe assembly to the housing assembly at the tape port, the wipe assembly comprises
      i. an upper wipe blade positioned above the tape port engaging a top surface of the tape, and
      ii. a lower wipe blade positioned below the tape port and engaging a bottom surface the tape, the upper wipe blade and the lower wipe blade defining a concavo-convex slit through which the tape passes.

12. The method of claim 11, wherein the upper and lower wipe blades are made of a flexible, resilient material.

13. The method of claim 12, wherein the flexible, resilient material is a polyurethane.

14. The method of claim 11, wherein the upper wipe blade forms an angle with the top surface of the tape of 0° to about 45°.

15. The method of claim 11, wherein the lower wipe blade forms an angle with the bottom surface of the tape of 0° to about 45°.

16. The method of claim 11, further comprising the step of attaching a hook assembly to the first end of the tape, the hook assembly contains a hook body extending approximately perpendicular to the tape, and an attachment portion for attaching to the first end of the tape.

17. The method of claim 16, wherein the housing assembly provides a set back wall where the tape port is located under a ledge.

* * * * *